United States Patent [19]
Berger

[11] 3,916,489
[45] Nov. 4, 1975

[54] COUPLING
[75] Inventor: William L. Berger, Erie, Pa.
[73] Assignee: Morris Coupling & Clamp Company, Erie, Pa.
[22] Filed: Apr. 22, 1974
[21] Appl. No.: 462,653

[52] U.S. Cl. .................. 24/279; 138/99; 285/373
[51] Int. Cl.² ....................................... B65D 63/02
[58] Field of Search .......... 285/373, 236, 366, 419, 285/252, 253, 367; 403/313; 138/99; 24/279, 281, 285, 68 BT

[56] References Cited
UNITED STATES PATENTS

| 204,770 | 6/1878 | Smith | 285/373 X |
| 1,471,188 | 10/1923 | Musted | 138/99 |
| 1,479,679 | 1/1924 | Sandholm | 24/279 X |
| 3,565,468 | 2/1971 | Garrett | 285/373 |

FOREIGN PATENTS OR APPLICATIONS

| 339,065 | 12/1930 | United Kingdom | 24/279 |
| 14,441 | 10/1915 | United Kingdom | 285/253 |
| 12,830 | 6/1913 | United Kingdom | 24/285 |

Primary Examiner—Thomas F. Callaghan

[57] ABSTRACT

A coupling or clamp for clamping a tube or pipe made up of an elongated band surrounding a gasket. A notch is formed in one end of the band and a strike is fixed to the other end of the band and disposed in the notch. The ends of the band on each side of the notch are bent back on themselves forming eyelets, which receive a yoke. The yoke has a curved intermediate part that has a weld nut welded in it and a screw extends through the weld nut. The end of the screw engages the strike. When a screw is swung to a position generally parallel to the diameter of the tube, its end can engage the strike. Then as the screw is swung to a position tangent to the pipe, its toggle action exerts a preliminary tension on the band. Final tensioning is accomplished by operating the screw in a conventional manner.

2 Claims, 3 Drawing Figures

U.S. Patent  Nov. 4, 1975  3,916,489
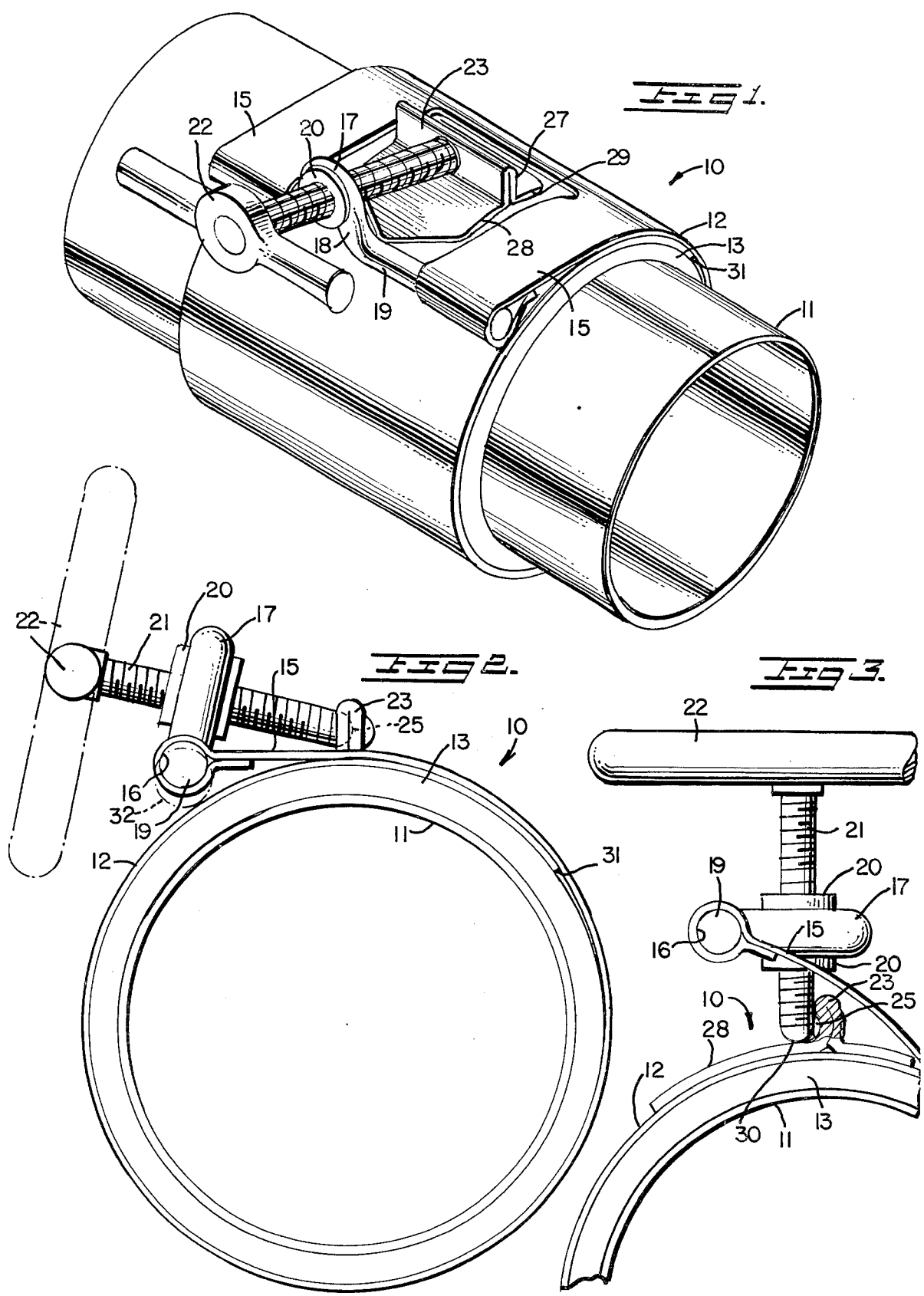

COUPLING

REFERENCE TO PRIOR ART

The coupling disclosed herein is an improvement over the coupling shown in U.S. Pat. Nos. 914,150, 817,285 and 701,669.

OBJECTS OF THE INVENTION

It is an object of the invention to provide an improved coupling.

Another object of the invention is to provide a coupling that is simple in construction, economical to manufacture, and simple and efficient to use.

With the above and other objects in view, the present invention consists of the combination and arrangement of parts hereinafter more fully described, illustrated in the accompanying drawing and more particularly pointed out in the appended claims, it being understood that changes may be made in the form, size, proportions, and minor details of construction without departing from the spirit or sacrificing any of the advantages of the invention.

GENERAL DESCRIPTION OF THE DRAWINGS

FIG. 1 is a perspective view of a coupling according to the present invention.

FIG. 2 is an end elevational view of FIG. 1, showing the tube in its clamped position with the yoke swung to intermediate position.

FIG. 3 is a fragmentary view similar to FIG. 2, showing the tube in the unclamped position.

DETAILED DESCRIPTION OF THE DRAWINGS

The specification discloses a clamp type coupling 10 for use with a tube or pipe 11. The coupling is made up generally of a tensioning band 12 that surrounds a gasket 13. The band 12 has an end 31 and the end having eyelets 16 overlaps end 31. The tensioning band 12 has a notch 14 formed in one end and the ears 15 on each side of the notch are bent back on themselves, forming eyelets 16. The eyelets 16 receive the ends 19 of the yoke 17. The weld nut 20 is welded into the curved part of the yoke 17 and the screw 12 is threaded into the weld nut 20. The screw 21 has a handle 22. The end of the screw terminates in a hemispherical shaped end 26 that is received in the cavity 25 in the strike 23. The strike 23 is welded to the end of the band opposite the end having the notch 14. The strike 23 is supported in the center of the band and the notch 14 is slightly wider than the strike so that the strike can move freely in the notch 14. In the example shown, the strike may be made of sheet material similar to that from which the band 12 is made. The sheet metal strike is bent back on itself at 26 forming the outwardly extending portions 27 terminating in the ends 28 and 29 which are in turn welded to the tensioning band 12, said strike comprising a piece of sheet material slightly narrower than said notch, and having an intermediate part thereof bent back on itself forming an outwardly extending portion extending generally radially of said coupling. The ends of the strike rest on said band and extend from the outwardly extending portion a substantial distance and terminate short of the end of the band.

In operation, the gasket 13 and tensioning band 12 will be placed around the pipe 11. The rounded end 30 of the screw 21 will be placed in the cavity 25 against the strike 23 with the screw 21 parallel to a diameter of the tube or pipe 11. The screw 21 will then be swung to the positions shown in FIGS. 1 and 2 and finally to the position shown in phantom at 32 in FIG. 2. This will preliminarily tension the tensioning band 12. The operator can then rotate the screw 21 by means of the handle 22 further tightening the tensioning band. It will be noted that when the eyelets 16 come in close proximity to the outer periphery of the tensioning band as shown in FIG. 2 with the screw tangent to the pipe, the center of the ends 19 of the yoke 17 will be between a tangent line to the screw 21 at the outer periphery of the tensioning band 12 thus providing a toggle action.

The foregoing specification sets forth the invention in its preferred practical forms but the structure shown is capable of modification within a range of equivalents without departing from the invention which is to be understood is broadly novel as is commensurate with the appended claims.

The embodiments of the invention in which an exclusive property or privilege is claimed are defined as follows:

1. A coupling for a tube, pipe or the like comprising,
   a tensioning band made up of flexible relatively thin flat material adaptd to lay on the outside surface of a pipe or tube,
   said tensioning band is disposed around a gasket,
   said tensioning band having a notch formed in one end,
   the ends of the material defining said notch having their ends rolled back forming eyelets,
   a yoke having a curved intermediate part and two straight end parts,
   said end parts being rotatably received in said eyelets,
   a nut having one side fixed to the inside curve of the intermediate part of said yoke,
   said two straight end parts extending outwardly from said intermediate part and being disposed on a line passing on the opposite side of said nut from said one side,
   said nut receiving a screw,
   a strike on the end of said band opposite said notch,
   said strike comprising a piece of sheet material slightly narrower than said notch, and having an intermediate part thereof bent back on itself forming an outwardly extending portion extending generally radially of said coupling,
   the ends of said strike resting on said band and extending from said outwardly extending portion a substantial distance and terminating short of the end of said band,
   said strike having a seat found on said outwardly extending part adapted to engage an end of said screw,
   said screw being adapted to be swung with said yoke to a position parallel to a diameter of said pipe and having the end of said screw engage said seat,
   said screw being adapted to be swung to a position tangent to said pipe at said strike and said yoke disposed between a line passing through said screw parallel to the axis of said pipe and the outer periphery of said band whereby the said tensioning band is preliminarily tensioned,
   said screw being adapted to be tightened by rotating said screw in said nut with said eyelets swung into engagement with said band whereby said tensioning band is tensioned and said coupling is held in closed position by toggle action of said screw and said yoke.

2. The coupling recited in claim 1 wherein said ends of said band overlap each other and, said screw has a hemispherical shaped end and said seat in said stroke has a complementary shaped seat for receiving said screw end.

* * * * *